Patented Sept. 7, 1937

2,092,131

UNITED STATES PATENT OFFICE 2,092,131

SALTS OF AMINO ACRIDINES

Fritz Mietzsch, Wuppertal-Elberfeld, and Hans Mauss, Wuppertal-Barmen, Germany, assignors to Winthrop Chemical Company, Inc., New York, N. Y., a corporation of New York No Drawing. Application March 27, 1936, Serial No. 71,312. In Germany April 13, 1935

8 Claims. (Cl. 260—36)

This invention relates to salts of 9-amino- and 9-alkyl-amino-acridines which are readily soluble in water.

9-amino- and 9-alkylamino-acridines hitherto have been used preferably in the form of their salts with mineral acids, particularly in the form of their hydrochlorides. The known salts of the 9-amino- and 9-alkylamino-acridines in many cases do not satisfy the requirements of the medical practice, particularly in the case where the 9-amino- and 9-alkylamino-acridine compounds are to be used for injection purposes. In this respect preparations of the 9-amino- and 9-alkylamino-acridines are of great practical importance which readily and rapidly dissolve in water to a great extent.

In accordance with the present invention the 9-amino- and 9-alkylamino-acridines can be transformed into products which are readily and rapidly soluble in water by the manufacture of their salts with alkyl sulfonic acids. The manufacture of these salts may be performed by neutralizing one mol. of the 9-amino-acridine compound with one mol. of the alkyl sulfonic acid. The alkyl sulfonates of the 9-amino-acridine compounds may also be obtained by the known method of double decomposition of 9-amino-acridine salts with salts of the alkyl sulfonic acids. As alkyl sulfonic acid preferably the methane sulfonic acid is used; but also other alkyl sulfonic acids, for instance, ethane, propane and butane sulfonic acids yield readily soluble salts with the 9-amino- and 9-alkylamino-acridine compounds. The 9-amino- and 9-alkylamino-acridine compounds may contain substituents in the nucleus, such as alkyl, alkoxy, alkyl mercapto, halogen, nitro and amino groups. The 9-amino group may contain one or two alkyl groups as substituents or an alkylene group. In the latter case the amino group forms with the alkylene group a saturated heterocyclic ring system, for instance a pyrrolidine or piperidine ring.

The invention is further illustrated by the following examples without being restricted thereto:—

*Example 1.*—25.3 grams of 2-ethoxy-6.9-diamino-acridine are dissolved in alcohol while heating and treated while still hot with 9.6 grams of methane sulfonic acid. On cooling the mono-methane sulfonate of the 2-ethoxy-6.9-diamino-acridine crystallizes in the form of yellow crystals which melt at about 268° C. The salt is much better soluble than the corresponding hydrochloride and lactate.

*Example 2.*—24 grams of 3-nitro-9-amino-acridine are suspended in 240 ccs. of alcohol and mixed with an alcoholic solution of methane sulfonic acid while stirring until the red color of the base is transformed into the pure yellow color of the methane sulfonic acid salt. After some time the latter salt is filtered with suction and dried. It melts above 280° C. and dissolves readily in water while cold, whereas the hydrochloride is practically insoluble in water. The solution is neutral to Congo.

When using instead of 3-nitro-9-amino-acridine 3-nitro-9-ethylamino-acridine forming dark red prisms melting at 173-174° C., a readily soluble orange colored methane sulfonate melting at about 250° C. is obtained; when using 2-nitro-9-ethylamino-acridine which forms a red powder melting at 187-188° C. a yellow methane sulfonate melting at about 250° C. is obtained; 2-nitro-9-butylamino-acridine forming red crystals melting at 105-106° C., yields a yellow methane sulfonate melting at about 155-160° C.

In an analogous manner the 2-chloro-9-amino-acridine (yellow crystals melting at 277° C.), 6-chloro-9-amino-acridine (yellow crystals melting at 269-270° C.), 2-methoxy-9-amino-acridine (yellow crystals melting at 225° C.), yield yellow crystalline salts which readily dissolve in water with methane, ethane and butane sulfonic acid.

*Example 3.*—30.2 grams of methylmercapto-6-chloro-9-ethylamino-acridine (orange yellow crystals from alcohol melting at 115° C.) are dissolved in acetone while cold and a solution of methane sulfonic acid in acetone is added until the reaction is acid to Congo. Thereupon the mono-methane sulfonate of the 2-methylmercapto-6-chloro-9-ethylamino-acridine is precipitated in yellow crystals which melt at 199-200° C. The product is readily soluble in water.

*Example 4.*—26.2 grams of 9-piperido-acridine (straw-yellow crystals from dilute alcohol melting at 113-114° C.) are dissolved in 250 ccs. of acetone and treated with a solution of 9.6 grams of methane sulfonic acid in acetone. Thereupon the yellow methane sulfonic acid salt which melts at 265° C. crystallizes. It is readily soluble in water with orange yellow coloration.

On replacing the 9-piperido-acridine by 31.5 grams of 2-methoxy-6-chloro-9-diethylamino-acridine the yellow methane sulfonic acid salt is obtained which melts at about 225° C. and is readily soluble in water with reddish-yellow coloration.

We claim:—

1. A compound selected from the group consisting of lower alkyl sulfonates of 9-amino- and 9-alkylamino-acridines.

2. A compound selected from the group consisting of methane sulfonates of 9-amino- and 9-alkylamino-acridines.

3. A compound selected from the group consisting of lower alkyl sulfonates of 9-amino- and 9-alkylamino-acridines which are substituted in the nucleus by alkoxy groups.

4. A compound selected from the group consisting of methane sulfonates of 9-amino- and 9-alkylamino-acridines which are substituted in the nucleus by alkoxy groups.

5. A compound selected from the group consisting of lower alkyl sulfonates of 2-ethoxy-6.9-diamino-acridine.

6. 2-ethoxy-6.9-diamino-acridine-methane sulfonate.

7. A compound selected from the group consisting of lower alkyl sulfonates of 3-nitro-9-amino-acridine.

8. 3 - nitro - 9 - amino - acridine - methane - sulfonate.

FRITZ MIETZSCH.
HANS MAUSS.